March 13, 1973  P. M. EISENBERGER ET AL  3,720,843
NONLINEAR DEVICE FOR FREQUENCY SHIFTING X-RAYS
Filed March 10, 1971

INVENTORS P. M. EISENBERGER
S. L. McCALL, Jr.
BY Michael J. Urbano
ATTORNEY

3,720,843
Patented Mar. 13, 1973

3,720,843
NONLINEAR DEVICE FOR FREQUENCY SHIFTING X-RAYS
Peter M. Eisenberger, Morristown, and Samuel Leverte McCall, Jr., Gillette, N.J., assignors to Bell Telephone Laboratories, Incorporated, Murray Hill, N.J.
Filed Mar. 10, 1971, Ser. No. 122,702
Int. Cl. H03f 7/00
U.S. Cl. 307—88.3    6 Claims

ABSTRACT OF THE DISCLOSURE

A nonlinear device includes a medium (preferably characterized by a low X-ray absorption constant and near structural perfection) in which is established a time-varying microscopic charge density "cloud" by the application thereto of a perturbation signal of frequency $\omega_L$. An input X-ray signal of frequency $\omega_I$ is incident on the medium coincident with the perturbation signal and is thereby frequency shifted producing an output X-ray signal at the sum and/or difference frequencies $\omega_I \pm \omega_L$.

BACKGROUND OF THE INVENTION

This invention relates to nonlinear devices and, more particularly, to such devices for frequency shifting X-ray radiation to produce different frequency carrier signals for use in communication systems, for example.

At present there are well-known techniques for frequency shifting radiation at optical frequencies including second harmonic generation in nonlinear crystals such as KDP, Raman or Brillouin scattering in a medium such as $SrTiO_3$, and optical parametric interactions in a medium such as $LiNbO_3$. None of these techniques, however, are applicable to radiation in the X-ray portion of the spectrum. In fact, experiments in the X-ray region have almost exclusively been limited to observations of conventional Bragg scattering. In the latter phenomenon, X-ray radiation incident on an appropriate medium at the Bragg angle $\theta_B$ is symmetrically scattered by electrons in the ground state. This process, however, involves no change in frequency of the X-ray radiation.

It is, therefore, an object of our invention to frequency shift X-ray radiation.

It is another object of our invention to frequency shift an X-ray signal by an amount related to the frequency of another signal applied coincidentally to a common region of an appropriate medium.

SUMMARY OF THE INVENTION

These and other objects are accomplished in accordance with an illustrative embodiment of our invention, a nonlinear device including an appropriate medium, such as a diamond crystal, in which is established a time-varying microscopic charge density "cloud" induced by the incidence of a perturbation signal of frequency $\omega_L$. The perturbation signal may take many forms, e.g., an optical or acoustic signal or an electron beam. An input X-ray signal of frequency $\omega_I$ is incident on the medium coincident with the perturbation signal and is thereby frequency shifted producing an output X-ray signal at the sum and/or difference frequencies $\omega_I \pm \omega_L$.

In the case of an optical perturbation signal, the sum and difference frequency generation may be described as follows: the optical signal in a crystal interacts with the atoms resulting in a microscopic charge density or "cloud" which differs from the ground state charge density. The induced charge density has a periodicity determined largely by the periodicity of the crystal and to a lesser extent by the light wave vector. The input X-ray beam scatters from the moving induced charge density, the output X-ray frequency being up or down shifted, as determined by the Doppler process or energy-momentum conservation.

In contrast with conventional Bragg scattering techniques in which the input angle of the X-ray radiation is equal to $\theta_B$ within a carefully maintained tolerance as small as a few seconds of arc, in our invention the deviation from $\theta_B$ is preferably of the order of a few minutes of arc in order to reduce standard Bragg scattering, thereby permitting the input X-rays to penetrate further into the crystal and thus increase the interaction volume. Moreover, as mentioned previously, conventional Bragg scattering produces no frequency shift in the X-ray radiation.

In contrast with conventional sum and difference frequency generation at optical frequencies, our medium need not have an inherent center of inversion in the potential energy distribution of its electrons. Instead, we utilize an optical perturbation signal to displace the outermost electrons of an appropriate crystal which may or may not be asymmetrical. Although the displacement of electrons is small, the input X-ray radiation, due to its extremely short wavelength, can effectively "see" the small displacement and hence the induced asymmetry. Consequently, when unperturbed our crystal need not possess inherent asymmetry.

Criteria for selecting media with high conversion efficiencies, as well as the relationship between input and output angles of incidence, control signal frequency and the crystal parameters will be discussed in detail hereinafter.

BRIEF DESCRIPTION OF THE DRAWING

These and other objects of the invention, together with its various features and advantages, can be more easily understood from the following more detailed description taken in conjunction with the accompanying drawing, in which.

DETAILED DESCRIPTION

Figure 1:
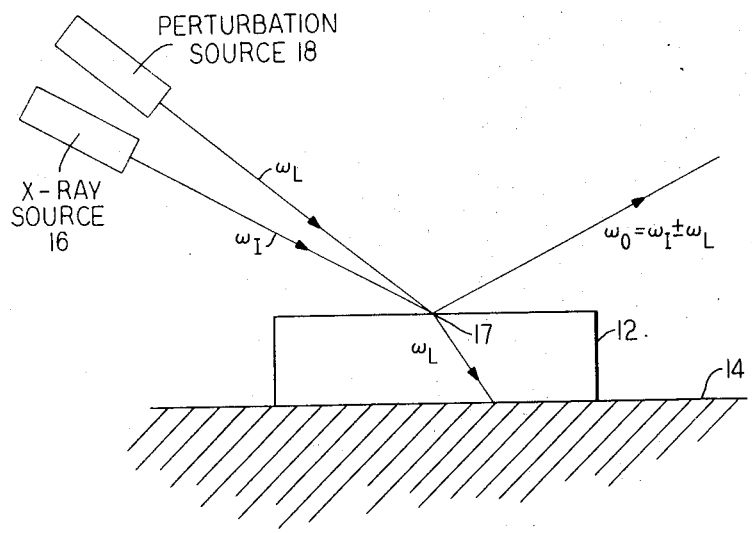
FIG. 1 is a schematic showing sum and/or difference frequency generation of X-ray radiation in accordance with an illustrative embodiment of our invention.
Figure 2:
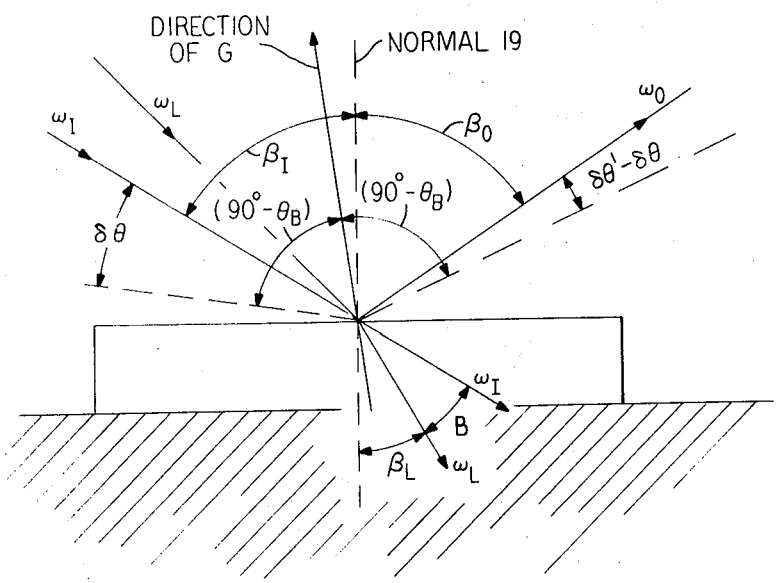
FIG. 2 is a schematic as in FIG. 1 showing the relationship between input and output angles for the X-ray radiation and the reciprocal lattice vector and crystal face normal.

Turning now to FIGS. 1 and 2 there is shown schematically an illustrative embodiment of our invention, nonlinear device 10 comprising an appropriate medium 12, such as a diamond crystal, mounted on a substrate 14 to facilitate handling. A source 16 of X-ray radiation produces an input X-ray beam at frequency $\omega_I$ incident on a region 17 of the medium 12 at an angle $\beta_I$ as measured from the normal 19 to the crystal face 21 or, more generally, from the normal to the reflecting planes of the crystal if such planes and surface 21 are nonparallel. By means well known in the art, a source 18 of optical radiation generates an optical perturbation signal of frequency $\omega_L$ incident on region 17 coincident with the X-ray signal.

As discussed previously, the optical perturbation signal induces a time-varying microscopic charge density cloud of the outermost electrons of the atoms of medium 12 which causes a frequency shift in the X-ray radiation such that $\omega_0 = \omega_I \pm \omega_L$.

As shown in FIG. 2 the input X-ray angle $\beta_I$ differs from the Bragg angle by an amount $\delta\theta$ and the output X-ray angle $\beta_0$ differs from $\theta_B$ by an amount $\delta\theta'$ which is related not only to the deviation of the input angle of the X-ray radiation from the Bragg angle but also to the frequency of the optical control signal. More specifically, $$\delta\theta' = \pm \frac{q_L}{k_I \cos \theta_B} \left[ \frac{\sin \theta_B}{n} + \sin(\theta_B + B) \right] \quad (1)$$

where: $q_L$ is the magnitude of the light wave vector, that is, $$q_L = \frac{n\omega_L}{c} \quad (2)$$

$n$ being the index of refraction of medium 12 at $\omega_L$; $c$ is the speed of light; $k_I$ is the magnitude of the input X-ray wave vector analogous to $q_L$; and B is the angle between the input light beam vector and the input X-ray beam vector.

The output intensity of the sum or difference X-rays is peaked under phase matched conditions, i.e., when $$\omega_o = \omega_I \pm \omega_L \quad (3)$$

and $$\vec{k}_o = \vec{k}_I + \vec{G} \pm \vec{q}_L \quad (4)$$

where $\vec{k}_o$ is the output X-ray wave vector and $\vec{G}$ is the reciprocal lattice vector of medium 12. The deviation from perfect phase matching is represented by a momentum mismatch $\Delta k$ which, assuming that the range of $\Delta k$ in the input is primarily determined by the finite source collimation, is given by $$\Delta k = k_I \sin 2\theta_B d\Phi \quad (5)$$

where $d\Phi$ is the deviation, from the phase matching angle, of the angle between the input X-rays and the crystal normal. Thus, phase matching occurs when $\Delta k = 0$.

In general, however, and assuming a nearly perfect crystal structure as well as plane waves for the input X-ray and optical signals, it can be shown that the fractional scattered intensity S of frequency shifted output X-rays is given by $$S = \frac{\lambda_o^2 r_o^2 \cos^2 \varphi |\rho_L(q_L + G)|^2}{\Delta k^2 + \left(\frac{\alpha_T + \alpha_o}{2}\right)^2} \frac{\cos \beta_I}{\cos \beta_o} \quad (6)$$

where the factor $\cos \beta_I \cos \beta_o$ takes into account the possibility of different input and output X-ray beam diameters; $\lambda_o$ is the wavelength of the output X-rays; $r_o = e^2/mc^2$, the classical electron radius; $\varphi$ is the angle between the input and output X-ray polarization vectors; $\rho_L$ is a Fourier component of the light-wave-induced charge density; $\alpha_o$ is the absorption constant of the output X-rays; $\alpha_L$ is the absorption constant of the light wave; and $\alpha_T$ is defined by $$\alpha_T = \cos \beta_o \left( \frac{\alpha_L}{\cos \beta_L} + \frac{\alpha_I}{\cos \beta_I} \right) \quad (7)$$

where the z-axis is the outward normal 19 to the crystal face, $\beta_L$ and $\beta_I$ are the angles that incident light and input X-ray beams inside the crystal make with the face normal.

The range of angles in the input that can be mixed by a perfect crystal is determined by $$\Delta k < \frac{1}{2}(\alpha_T + \alpha_o) \quad (8)$$

because a larger $\Delta k$ results in a smaller S given by Equation 6. For $\Delta k$ defined as in Equation 5, Equation 8 then determines a small angle $\Delta\Phi$ of order $10^{-9}$ rad, for values $\alpha_I = \alpha_o = \frac{1}{2}$, $\sin 2\theta_B = 0.5$, and $k_I = 5 \times 10^8$. Thus, it is justified to assume that, with presently available X-ray sources, the input X-ray beam will be collimated in the Bragg plane to an angle larger than $\Delta\Phi$. Under such conditions, of interest is the "integrated intensity," defined by $S_I = \int S(\Delta k) d\Phi$, where S is given by Equation 6. Using $\Delta k$ from Equation 5, it follows that $$S_I = \frac{\lambda_o^3 r_o^2}{2(\alpha_T + \alpha_o)} \left( \frac{1 + \cos^2 \varphi}{\sin 2\theta_B} \right) \frac{\cos \beta_I}{\cos \beta_o} (\vec{R}_G \cdot \vec{\epsilon}_L)^2 \quad (9)$$

where $(\vec{R}_G \cdot \vec{\epsilon}_L)$ is the component of the optically induced charge density along the direction of the reciprocal lattice vector $\vec{G}$, $\vec{\epsilon}_L$ is the optical electric field vector, and $\vec{R}_G$ is the component of the induced charge density per unit of electric field to be more fully discussed hereinafter. The number of output mixed X-ray photons $N_o$ is given by $$N_o = S_I N_I \quad (10)$$

where $N_I$ is the number of input X-ray photons/radian. The collimation perpendicular to the Bragg plane is assumed to be consistent with the phase matching condition. If the crystal is not perfect, Equation 10 still applies, under the condition that the input collimation is sufficiently broad to include the variation in direction of the reciprocal lattice vectors (see, Optical Principles of the Diffraction of X-rays, R. W. James, Cornell University Press, Ithaca, pp. 27–92 (1965)).

The previously mentioned component of the optically induced charge density per unit electric field, in magnitude is given by $$|\vec{R}_G| = sG\chi/e \quad (11)$$

where $\chi$ is the optical susceptibility of medium 12, $e$ is the charge of an electron and $s$, generally a fourth rank tensor, is a dimensionless quantity, whose elements vary from very small values to values of the order of $10^{-1}$. In fact, a comparison of the formula for $\vec{R}_G$ and the well-known formula for optical linear susceptibility reveals that $$s = \frac{\left| \sum_j \frac{p_j \omega_j}{\omega_j^2 - \omega_L^2} \int_{u.c.} d^3r \varphi_g(\vec{r}) e^{-i\vec{G} \cdot \vec{r}} \varphi_j(\vec{r}) \right|}{\left| \sum_j \frac{p_j \omega_j}{\omega_j^2 - \omega_L^2} \int_{u.c.} d^3r \varphi_g(\vec{r}) (Gr_k) \varphi_j(\vec{r}) \right|} \quad (12)$$

where $p_j$ in the above is a dipole matrix element between the electron ground state and $j$th excited state parallel to the light electric field $r_k$ is the component of the position vector $r$ parallel to the macroscopic induced polarization, $\omega_j$ is the frequency separation between the ground state and the $j$th excited state, the integral $$\int_{u.c.} d^3r$$

is a volume integral over a unit cell dxdydz, $\varphi_j$ is the wave function of electrons in the $j$th excited state, and $\varphi_g$ is the wave function of electrons in the ground state. The specific $\varphi$'s are well known to those skilled in the art.

In the limit or small $\vec{G}$ $s$ formally reduces to the cosine of the angle between $\vec{G}$ and the induced macroscopic polarization. In practice, the available vectors $\vec{G}$ are, of course, determined by the crystalline structure, and the smallest vector $$\vec{G}$$

is often approximately equal to an inverse atomic radius. The numerator in the above expression is, therefore, typically smaller than the denominator. Consequently, values of $s$ should be expected to range from $10^{-1}$ to $10^{-2}$ to nearly zero. If the states involved in the optical field and the vector $$\vec{G}$$

are perpendicular, then $s=0$. Generally, $s$ is smaller than usual under such conditions.

To estimate a value of $s$, consider solid hydrogen, taken to be in a simple cubic lattice structure. The dominant transition is taken to be the $1s$ to $2p$ transition and the wavefunctions those of the hydrogen atom. The light is polarized along $$\vec{G}$$

The size of G is taken to correspond to the density of liquid hydrogen, .07 gm./cm., so that $G=2.2\times 10^8$ cm.$^{-1}$.

For arbitrary G, Equation 12, upon the use of standard hydrogen wavefunctions, in this case reduces to $$s=\frac{1}{\left[1+\left(\frac{2Ga_o}{3}\right)^2\right]^3} \quad (13)$$

where $a_o=.51\times 10^{-8}$ cm. is the Bohr radius. The above value of G, therefore results in $s\cong .27$. It is important to notice that if G or $a_o$ had been chosen to be twice the above value, then a value of $s\cong .03$ would have been obtained.

In addition, it can be shown that the mixing efficiency is proportional to $s^2$. Equation 12 predicts zero mixing efficiency under certain arrangements of input angles and polarizations. For example, by varying the light polarization, one can go through a zero of mixing efficiency.

Choosing values of $\lambda_o=10^{-8}$ cm., a large value of $\alpha_T+\alpha_o=1$ cm.$^{-1}$, $G=\pi/2\times 10^8$, $\chi=\pi/4$, and a possibly pessimistic value $s=.05$, then $S_I=N_o/N_I=2.5\times 10^{-21}$, if a light input of 1 watt/cm.$^2$ is used to uniformly illuminate the X-ray spot region. A conventional X-ray tube dissipating 2 kilowatts emits about $2\times 10^{14}$ characteristic photons/sec. into a hemisphere $$soN_I \approx 1.5\times 10^{12}/\text{rad sec}$$

if the beam is collimated to 1° in the direction perpendicular to the scattering plane. For an input laser power of 100 watts spread over a .01 cm.$^2$ X-ray spot size, then the number of scattered photons $N_o$ should be approximately $4\times 10^{-5}$/sec. This number can be increased, for example, through the use of a higher brightness X-ray source. However, the signal rate to scattered X-ray background rate is also determined by the degree of perfection of available crystals, and a greater scattering efficiency would be desirable.

By use of a higher power pulsed laser source, emitting light during a total time T each second, the quantity $S_I$ and therefore the ratio of output mixed photons to background scattered photons may be increased during the time of the laser pulses. By not observing scattered background X-ray radiation when the laser pulse is off, one increases the signal count rate to background count rate. In this way one obtains greatly increased signal-to-noise ratios as long as the average light power is not severely reduced.

The number of mixed X-ray photons, under such conditions, is proportional to the input X-ray flux during the time of the laser light pulse. The rest of the X-rays are wasted. Hence, in addition to using a pulsed laser and gaining a factor $$1/\sqrt{T}$$

in signal-to-noise ratio, one should preferably use a pulsed X-ray source, and gain a similar factor $1/T$ in net output signal. For example, under the previously assumed conditions, with an average laser output of 1 watt and an average X-ray tube electrical input of 20 watts, with $T=10^{-8}$ sec., then $N_o=.4$/sec.

According to Equations 6 and 12, a large mixing efficiency occurs in a perfect crystal at the phase-matched condition $\Delta k=0$ under ideal conditions. If X-ray lasers provide a sufficient flux/cm.$^2$ rad of X-rays, then light X-ray mixing can be used to efficiently tune the X-ray laser output.

In general, the particular material utilized in medium 12 should preferably be chosen to maximize Equation 11. Consequently, materials with near structural perfection, low absorption constants and high index of refraction should be utilized. In this regard, materials with a low atomic number are preferred since X-ray absorption generally increases as approximately the fourth power of the atomic number. A high index of refraction $n$ increases the optical susceptibility since $$\chi=\frac{n^2-1}{4\pi}$$

In addition, although the medium need not be transparent to the optical signal, as long as the X-rays penetrate to a comparable depth, too high an $\alpha_L$ may result in damage to the crystal. It is advantageous, therefore, to utilize a material with a sharp optical absorption edge (obtained for example by cooling the material) so that $\omega_L$ may be fixed near the absorption edge where $\alpha_L$ is small and $\chi$ is large.

Moreover, since the reciprocal lattice vectors are tabulated (see International Tables for X-Ray Crystallography, edited by C. H. Macgillavry et al., Kynock Press, Birmingham, England (1962)), Equation 11 may be maximized by calculating $s$ from Equation 12 for all the Gs of the chosen crystal and then utilizing the particular G which maximizes $s$.

From the above criteria, we have found that diamond is a preferred material.

Figure 3:
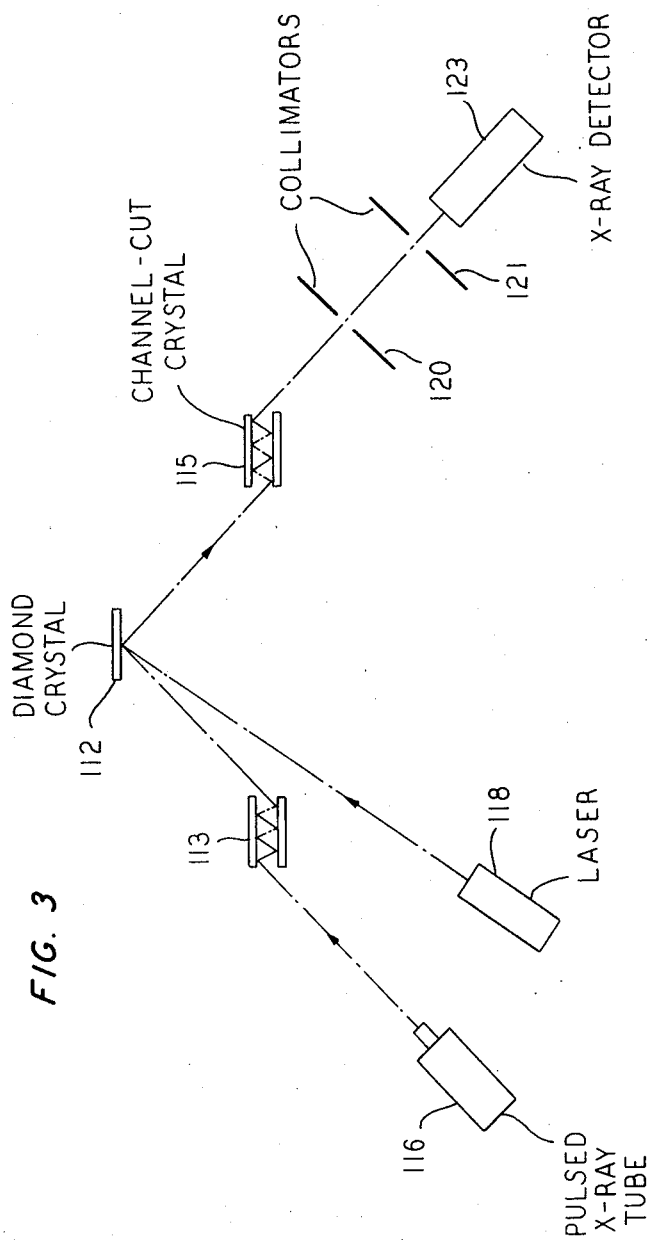
FIG. 3 is a schematic of another illustrative embodiment of our invention.

The construction of an X-ray frequency shifter as shown in FIG. 3 centers around three considerations: (1) sufficient input light from laser 118 during a relatively short time, but below peak powers and energies which damage the diamond crystal 112 in which the mixing process occurs (2) sufficient X-ray input from X-ray tube 116 coincident with the light (3) rejection of background.

High power, short duration light pulses are achieved through the use of a commercial laser 118, such as a 500 p.p.s. pulsed $N_2$ laser operation at 3371 A. The output is about 200 kw. for 10 nsec., with an output beam $\frac{1}{4}\times 5$ cm. with collimation $.1\times 1.5$ degree.

The X-ray source 116 can deliver more than about $10^{-4}$ joules of characteristic X-ray/pulse in a .01 cm.$^2$ spot, coincident with the laser pulse. It should be noted that the above figure corresponds (at 500 p.p.s.) with an electrical input of 50 watts.

Background is rejected by the use of a pair of well-known "channel cut" crystal filters 113 and 115 as Bragg collimators. These filters, typically fabricated by cutting an elongated channel in a silicon or germanium crystal, more than adequately reject unmixed X-ray photons through a multiple reflection process when disposed at the Bragg angle to incident X-ray radiation. As shown in FIG. 3, the output of X-ray tube 116 passes first through filter 113, undergoing multiple reflections, to incidence on crystal 112. The frequency shifted output X-rays pass through filter 115, again undergoing multiple reflections, and then through collimators 120 and 121 to detector 123.

The use of short duration X-ray pulses is advantageous since, as previously mentioned, the mixing efficiency generally increases as the inverse pulse width. In addition, a highly collimated X-ray beam would enable one to direct the entire output into a high conversion efficiency direction.

For a diamond crystal the following values are appropriate parameters:

$$\chi = \frac{n^2-1}{4\pi} = .53$$

$n \cong 2.8$, the index of refraction at 3371 A.

$$G_{111} = \frac{2\pi}{d} = 3.05 \times 10^8 (\text{cm}^{-1})$$

$d$ = spacing between the 111 planes
$s \cong .50$

For noncollinear interaction and copper X-ray radiation in a symmetric scattering configuration the other parameters are:

$\lambda_I = 1.54$ A.
$\sin 2\theta_B = .694$
$\alpha_T + \alpha_0 = 32.2$
$1 + \cos 2\theta_B = 1.72$
$\cos \beta_I / \cos \beta_0 = 1$
$\theta_B \cong 22°$
$\delta\theta \cong 4.63$ min.
$B = \pi/2 - \theta_B \approx 68°$ Under pulsed conditions Equations 9 and 10 give for the number of output photons per second, $N_o$ $$N_o = 10^{-18} \frac{N_I P_L}{\tau} \quad (15)$$

where $N_I$ is number of X-ray photons per second per radian incident on the crystal, $P_L$ is the average power per square cm. of light power incident on the sample and $\tau$ is the duration of the pulse.

Using the conditions described earlier, $P_L = 50$ watts/cm.$^2$, $N_I = 10^{10}$ per second per radian and $\tau = 10^{-8}$ seconds. Thus $N_o \cong 5$/sec.

It should be noted that for a well collimated source ($10^{-8}$ rad) and a perfect crystal-like diamond, mixing efficiencies can be as high as 5–20%. Moreover, the volume of interaction is increased by the use of collinear optical and X-ray input beams.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, while it is preferable that the angle of the input X-rays deviates from $\theta_B$, it may be possible to enhance efficiency at $\theta_B$ due to resonance effects either inherent in the medium or created by placing the medium in a resonator. Moreover, while the foregoing description relates to the use of an optical perturbation signal, any form of excitation (e.g., an acoustic signal or an electron beam) which produces a time-varying charge density may also be used. In the acoustic case, higher mixing efficiencies (due to a larger cross section), but smaller frequency shifts, would occur.

What is claimed is:
1. Nonlinear apparatus comprising, in combination,
   a crystal body of material characterized by near structural perfection and a low X-ray absorption constant,
   pulsed perturbation means for establishing in said body a time-varying charge density distribution which oscillates at a frequency $\omega_L$, and
   means for making a short duration, high intensity input X-ray pulse of frequency $\omega_I$ incident on said body substantially simultaneous with the establishment of said charge density distribution to generate from said body an output X-ray pulse having a frequency $\omega_o = \omega_I \pm \omega_L$.
2. The apparatus of claim 1 wherein said body has a high index of refraction and said pulsed perturbation means comprises means for applying to said body an optical pulse of optical frequency $\omega_L$.
3. The apparatus of claim 2 wherein said body comprises a diamond crystal.
4. The apparatus of claim 2 wherein said body comprises solid hydrogen.
5. The apparatus of claim 1 wherein said perturbation means comprises means for applying to said body an acoustic signal of frequency $\omega_L$.
6. The apparatus of claim 1 wherein said perturbation means comprises means for applying to said body an electron beam.

References Cited

Freund et al., "Physical Review Letters," vol. 23, pp. 854–857.

Freund et al., "Physical Review Letters," vol. 25, Nov. 2, 1970, pp. 1241–1245.

Eisenberger et al., "Physical Review Letters," Mar. 23, 1971, pp. 684–688.

ROY LAKE, Primary Examiner

D. R. HOSTETTER, Assistant Examiner

U.S. Cl. X.R.
313—55; 330—4.5